US012518918B2

(12) United States Patent
Bustreo et al.

(10) Patent No.: US 12,518,918 B2
(45) Date of Patent: Jan. 6, 2026

(54) COMPONENT AND METHOD FOR MANUFACTURING INSULATING SPACERS

(71) Applicant: HITACHI ENERGY LTD, Zürich (CH)

(72) Inventors: Gianluca Bustreo, Mirano (IT); Paolo Pavanello, Granze (IT)

(73) Assignee: HITACHI ENERGY LTD, Zürich (CH)

( * ) Notice: Subject to any disclaimer, the term of this patent is extended or adjusted under 35 U.S.C. 154(b) by 0 days.

(21) Appl. No.: 17/920,081

(22) PCT Filed: Jan. 28, 2021

(86) PCT No.: PCT/EP2021/051988
§ 371 (c)(1),
(2) Date: Oct. 20, 2022

(87) PCT Pub. No.: WO2021/213707
PCT Pub. Date: Oct. 28, 2021

(65) Prior Publication Data

US 2023/0162915 A1 May 25, 2023

(30) Foreign Application Priority Data

Apr. 20, 2020 (EP) .................................... 20170386

(51) Int. Cl.
*H01F 27/32* (2006.01)
*H01F 41/12* (2006.01)

(52) U.S. Cl.
CPC ......... *H01F 41/125* (2013.01); *H01F 27/323* (2013.01); *H01F 41/127* (2013.01)

(58) Field of Classification Search
CPC .... H01F 41/125; H01F 27/323; H01F 41/127; H01F 27/324; H01F 41/12; H01F 27/32; H01F 27/30; H01F 27/303; H01F 27/306
See application file for complete search history.

(56) References Cited

U.S. PATENT DOCUMENTS 1,938,421 A * 12/1933 Gilbert .................. H01F 27/306 336/185
2,847,650 A * 8/1958 Glassanos ............. H01F 27/303 336/185
(Continued)

FOREIGN PATENT DOCUMENTS

CN 1422356 A 6/2003
CN 101091228 A 12/2007
(Continued)

OTHER PUBLICATIONS

International Search Report and Written Opinion of the International Searching Authority, PCT/EP2021/051988, mailed May 4, 2021, 16 pages.
(Continued)

*Primary Examiner* — Mang Tin Bik Lian
(74) *Attorney, Agent, or Firm* — Sage Patent Group

(57) ABSTRACT

A component for manufacturing an insulating spacer for electromagnetic induction apparatuses. Said component is formed by a body of plastic material having opposite first and second surfaces, opposite first and second sides and opposite third and fourth sides, a first distance between said first and second surfaces. At least one of said first and second sides comprises coupling means for coupling with complementary coupling means of a further one of such component for manufacturing said insulating spacer.

16 Claims, 17 Drawing Sheets

(56) References Cited

U.S. PATENT DOCUMENTS

| | | | | | |
|---|---|---|---|---|---|
| 4,219,791 | A * | 8/1980 | Moore | H01F 27/323 174/120 SR |
| 8,183,972 | B2 * | 5/2012 | Hjortsberg | H01F 27/322 336/219 |
| 2003/0094230 | A1 * | 5/2003 | Sjoberg | E04F 15/02 156/308.8 |
| 2008/0061919 | A1 * | 3/2008 | Marek | H01F 27/2871 252/567 |
| 2013/0255899 | A1 | 10/2013 | Krahn et al. | |
| 2017/0301449 | A1 * | 10/2017 | Michalik | H01F 27/24 |
| 2020/0298542 | A1 | 9/2020 | Kuwajima et al. | |

FOREIGN PATENT DOCUMENTS

| | | | | | |
|---|---|---|---|---|---|
| CN | 201095826 | Y | | 8/2008 | |
| CN | 101405820 | A | | 4/2009 | |
| CN | 201478065 | U | | 5/2010 | |
| CN | 202120741 | U | | 1/2012 | |
| CN | 103021639 | A | | 4/2013 | |
| CN | 103347937 | A | | 10/2013 | |
| CN | 103348423 | A | | 10/2013 | |
| CN | 104246044 | A | | 12/2014 | |
| CN | 105788832 | A | | 7/2016 | |
| CN | 205399788 | U | | 7/2016 | |
| CN | 206774375 | U | | 12/2017 | |
| CN | 109559878 | A | | 4/2019 | |
| CN | 110603284 | A | | 12/2019 | |
| DE | 2841108 | A1 | | 4/1980 | |
| DE | 202010000328 | U1 | | 5/2010 | |
| JP | 61224302 | A | * | 10/1986 | H01F 27/324 |
| JP | S61224302 | A | | 10/1986 | |
| JP | 09-115722 | | * | 5/1997 | |
| WO | 200711189 | A1 | | 10/2007 | |
| WO | 2007111889 | A1 | | 10/2007 | |
| WO | 2014135205 | A1 | | 9/2014 | |
| WO | 2016073576 | A1 | | 5/2016 | |

OTHER PUBLICATIONS

Chinese Office Action, Chinese Patent Application No. 2021800379459, mailed Mar. 16, 2023, 11 pages.

Chinese Office Action, Chinese Patent Application No. 2021800379459, mailed Jul. 31, 2023, 6 pages.

* cited by examiner

COMPONENT AND METHOD FOR MANUFACTURING INSULATING SPACERS

CROSS REFERENCE TO RELATED APPLICATIONS

This application is a 35 U.S.C. § 371 national stage application of PCT International Application No. PCT/EP2021/051988 filed on Jan. 28, 2021, which in turn claims priority to European Patent Application No. 20170386.5, filed on Apr. 20, 2020, the disclosures and content of which are incorporated by reference herein in their entireties.

TECHNICAL FIELD

The present disclosure relates to the field of electromagnetic induction apparatuses for electric power transmission and distribution grids, for example power transformers.

More particularly, the present disclosure relates to a component and a method for manufacturing an insulating spacer intended for use in the electric windings of electromagnetic induction apparatuses.

BACKGROUND

Generally, electric windings of electromagnetic induction apparatuses include a number of turns arranged according to a winding direction and have axial and radial channels to ensure the passage of an electrically insulating medium (e.g., an insulating fluid or a solid cast resin) among the turns.

Typically, the axial channels of an electric winding are obtained by arranging insulating rods oriented in parallel to the winding direction of the electric winding while electrically insulating spacers, which are interposed between adjacent turns of the electric winding and oriented radially with respect to the winding direction, are arranged to define the above-mentioned radial channels.

Most traditional insulating spacers are made of pressed paperboard or wood materials. However, insulating spacers made of selected polymeric materials (e.g., polyetherimide—PEI), which have a relatively high dielectric rigidity, are now commonly used.

Although they represent a valid alternative to most traditional spacers of the state of the art, insulating spacers made of plastic materials have some manufacturing constraints. As is known, these insulating spacers are typically manufactured through industrial molding processes.

These manufacturing processes provide high quality products if the length of the manufactured spacers is shorter than a given threshold value (typically about 100 mm). However, it has been seen that insulating spacers with a longer size often show relevant structural defects.

This is basically due to the fact that the above-mentioned plastic materials with high electric rigidity are not suitable for being molded in large industrial molds as they cannot be distributed properly and fill the molding cavities uniformly.

Production waste may thus reach unacceptable levels when insulating spacers with an extended length have to be manufactured as it would be requested when electric windings with a huge size need to be assembled.

For this reason, insulating spacers made of plastic materials are generally used in electric windings having a limited size. Obviously, this circumstance represents a severe limitation from an industrial point of view.

This technical issue might be overcome by adopting other industrial processes (e.g., extrusion) to manufacture plastic insulating spacers. However, such a solution has proven to entail an increase of the manufacturing time and costs.

WO 2007/111889 A1 relates to a discrete insulating spacer element, which is used to separate and maintain space between the conducting windings or coils of a transformer, wherein the spacer element is made of a liquid crystalline polymer.

WO 2016/073576 A1 relates to an electrical transformer including a coil pack with windings, and spacers axially spacing turns of the windings from one another and being formed of a thermoplastic material.

SUMMARY

In the state of the art, it is thus quite felt the need for innovative technical solutions capable of overcoming or mitigating the above-mentioned technical problems.

In order to respond to this need, the present disclosure provides a component and a method for manufacturing an insulating spacer for electromagnetic induction apparatuses, according to the claims proposed in the following.

In a general definition, the component is formed by a flat elongated body of plastic material having opposite first and second surfaces, opposite first and second sides and opposite third and fourth sides.

A first distance between said first and second surfaces defines a thickness of said component, a second distance between said third and fourth sides defines a width of said component and a third distance between said first and second sides defines a length of said component.

At least one of said first and second sides comprises coupling means for coupling with complementary coupling means of a further one of such component according to the invention.

Said coupling means comprise one or more male-insertion elements for coupling with one or more complementary female-insertion elements of a further one of such component and/or one or more female-insertion elements for coupling with one or more complementary male-insertion elements of a further one of such component.

A component, according to the disclosure, may thus have male-insertion elements only or female-insertion elements only or both male-insertion elements and female-insertion elements at one of said first and second sides or at both said first and second sides.

According to some embodiments, the coupling means of a component, according to the disclosure, are configured so that a coupling with complementary coupling means of a further one of such component requires a first relative translation motion of said component with respect to said further one of such component, wherein said first relative translation motion is directed along the length of said component.

According to other embodiments, the coupling means of a component, according to the disclosure, are configured so that the coupling with complementary coupling means of a further one of such component requires a second relative translation motion of said component with respect to said further one of such component, wherein said second relative translation motion is directed along the width of said component.

According to other embodiments, the coupling means of a component, according to the disclosure, are configured so that the coupling with complementary coupling means of a further one of such component, according to an embodiment, requires a third relative rotary-translation motion of said component with respect to said further one of such component, wherein said third relative rotary-translation motion includes a rotation of said component around the width of said component and a translation of said component along the length of said component.

According to other embodiments, the coupling means of a component, according to the disclosure, are configured so that the coupling with complementary coupling means of a further one of such component requires a fourth relative translation motion of said component with respect to said further one of such component, wherein said fourth relative translation motion is directed perpendicularly to the first and second surfaces of said component.

Preferably, the component, according to the invention, has at least one of the aforesaid first and second sides, which comprises fixing means for coupling with a support element of an electric winding.

The present invention relates also to an insulating spacer for an electromagnetic induction apparatus, which comprises at least two components, according to the invention, as described above.

In particular, an insulating spacer, according to embodiment, comprises at least a first component and a second component. At a first side or at a second side, the first component has coupling means coupled with complementary coupling means of the second component, at a first side or at a second side of said second component.

The present disclosure relates also to a method for manufacturing an insulating spacer for an electromagnetic induction apparatus.

The method, according to an embodiment, comprises the following steps:

providing at least a first component and a second component, according to the invention, as described above;

joining said first component and said second component by coupling the coupling means of said first component, at a first side or at a second side of said second component, with the complementary coupling means of said second component, at a first side or at a second side of said second component.

BRIEF DESCRIPTION OF THE DRAWINGS

Further characteristics and advantages of the present disclosure will be more apparent with reference to the description given below and to the accompanying figures, provided purely for explanatory and non-limiting purposes, wherein.

DETAILED DESCRIPTION

With reference to the aforesaid figures, the present relates to a component 1A, 1B for manufacturing insulating spacers for electric windings of electromagnetic induction apparatuses (not shown), which are intended to be installed in electric power transmission and distribution grids.

An example of said electromagnetic induction apparatuses may be an electric transformer for electric power transmission and distribution grids, for example a power transformer or a distribution transformer.

The aforesaid component 1A, 1B is formed by a body of plastic material.

Preferably, such a plastic material may be any polymeric material suitable for an industrial molding process and having a relatively high electric rigidity. As an example, said plastic material may be a PEI, such as the material commercially known as ULTEM™.

Figure 1:
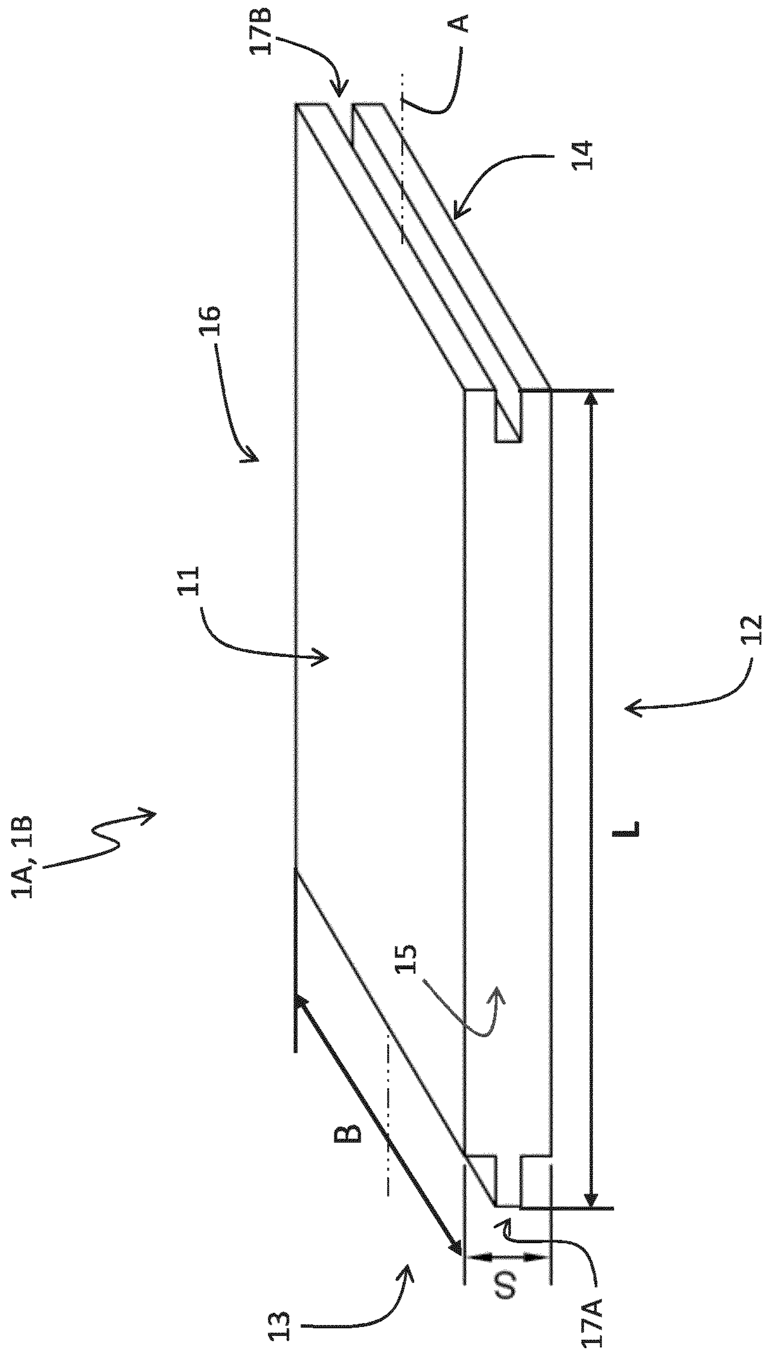
FIGS. 1-2 schematically show a component for manufacturing an insulating spacer, according to an embodiment.

Preferably, the plastic body forming the component 1A, 1B has a flat elongated shape extending along a main longitudinal axis A (FIG. 1).

The component 1A, 1A has opposite first and second surfaces 11, 12, opposite first and second sides 13, 14 and opposite third and fourth sides 15, 16.

A first distance between the first and second surfaces 11, 12 defines a thickness S of the component, a second distance between the third and fourth sides 15, 16 defines a width B of the component and a third distance between the first and second sides 13, 14 defines a length L of the component.

Preferably, the first and second sides 13, 14 are parallel to the first and second surfaces 11, 12 and are perpendicular to the third and fourth sides 15, 16 and to the main longitudinal axis A. Preferably, the third and fourth sides 15, 16 are parallel to the first and second surfaces 11, 12 and to the main longitudinal axis A and are perpendicular to the first and second sides 13, 14. Preferably, the component 1A, 1B is shaped as an elongated flat parallelepiped having a thickness S (few cm) very lower than the width B and the length L (some cm) and having the width B shorter than the length L.

The first and second sides 13, 14 of the component 1A, 1B may be shaped according to a variety of geometric profiles, as it will clearly emerge from the following description.

Preferably, the third and fourth sides 15, 16 of the component 1A, 1B are rectilinear. However, in principle, they may be differently shaped, e.g., with a curved profile.

An essential feature of the component 1A, 1B for manufacturing insulating spacers consists in that the at least one of the first and second sides 13, 14 comprises coupling means 17A, 17B intended to couple with complementary coupling means 17B, 17A of a further component 1B, 1A according to the invention.

Multiple components 1A, 1B may therefore be coupled along their length L and form an insulating spacer 100 having a longer modular structure.

Figure 15:
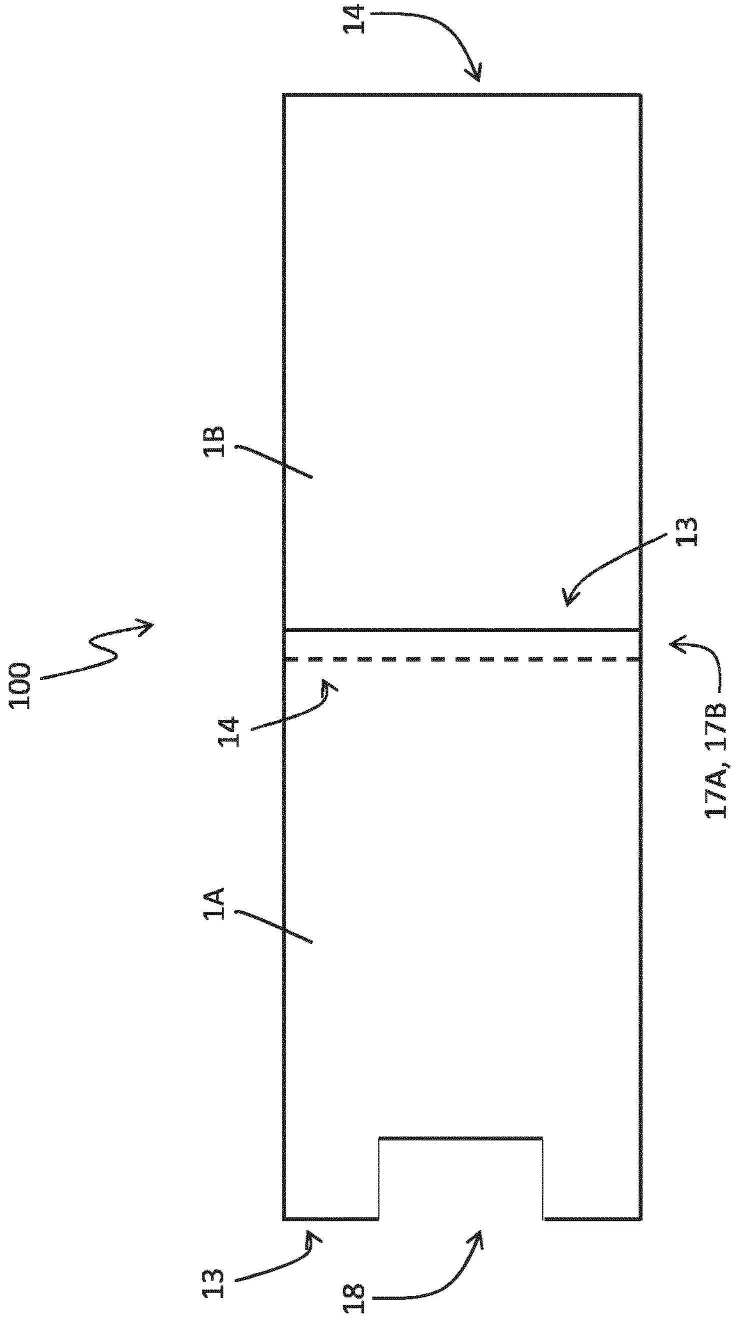
FIG. 15 schematically shows an example of insulating spacer including multiple components, which are modularly combined.
Figure 16:
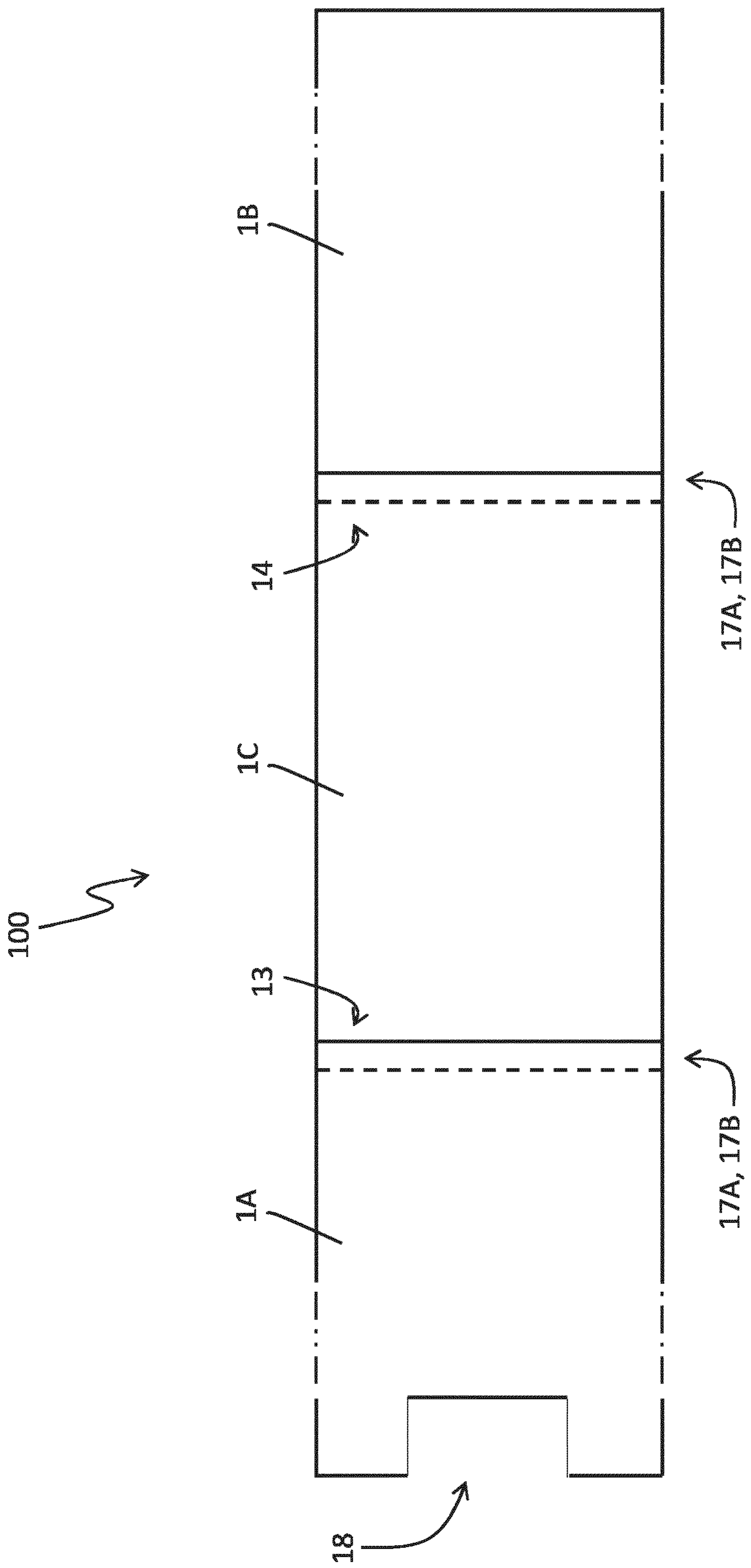
FIG. 16 schematically shows another example of insulating spacer including multiple components, which are modularly combined.

An insulating spacer 100 having a desired length may be formed by modularly combining multiple components 1A, 1B through their corresponding coupling means 17A, 17B (FIGS. 15-16).

Additionally, insulating spacers 100 of different lengths may be formed by using multiple components having a same size (e.g., with a length up to 8 cm), which is conveniently selected in such a way to satisfy the manufacturing constraints imposed by available molding processes.

According to an aspect, the coupling means 17A, 17B of a component 1A, 1B are configured to couple with the complementary coupling means 17B, 17A of a further component 1B, 1A through an insertion coupling of the male-female type.

The coupling means 17A, 17B of a component 1A, 1B may include one or more male-insertion elements 17A (e.g., shaped protrusions) for coupling with one or more corresponding complementary female-insertion elements 17B of a further component 1B, 1A and/or one or more female-insertion elements 17B (e.g., shaped grooves) for coupling with one or more corresponding complementary male-insertion elements 17A of a further component.

A component 1A, 1B may thus have (at one of the first and second sides 13, 14 or at both said first and second sides) male-insertion elements 17A only or it may have female-insertion elements 17B only or it may have both male-insertion elements 17A and female-insertion elements 17B.

FIG. 1 shows a component 1A, 1B, which is provided with coupling means including a male-insertion element 17A at the first side 13 and a female-insertion element 17B at the second side 14. In this case, multiple components 1A, 1B of this same type may be combined in a modular manner to form an insulating spacer 100.

Figure 2:
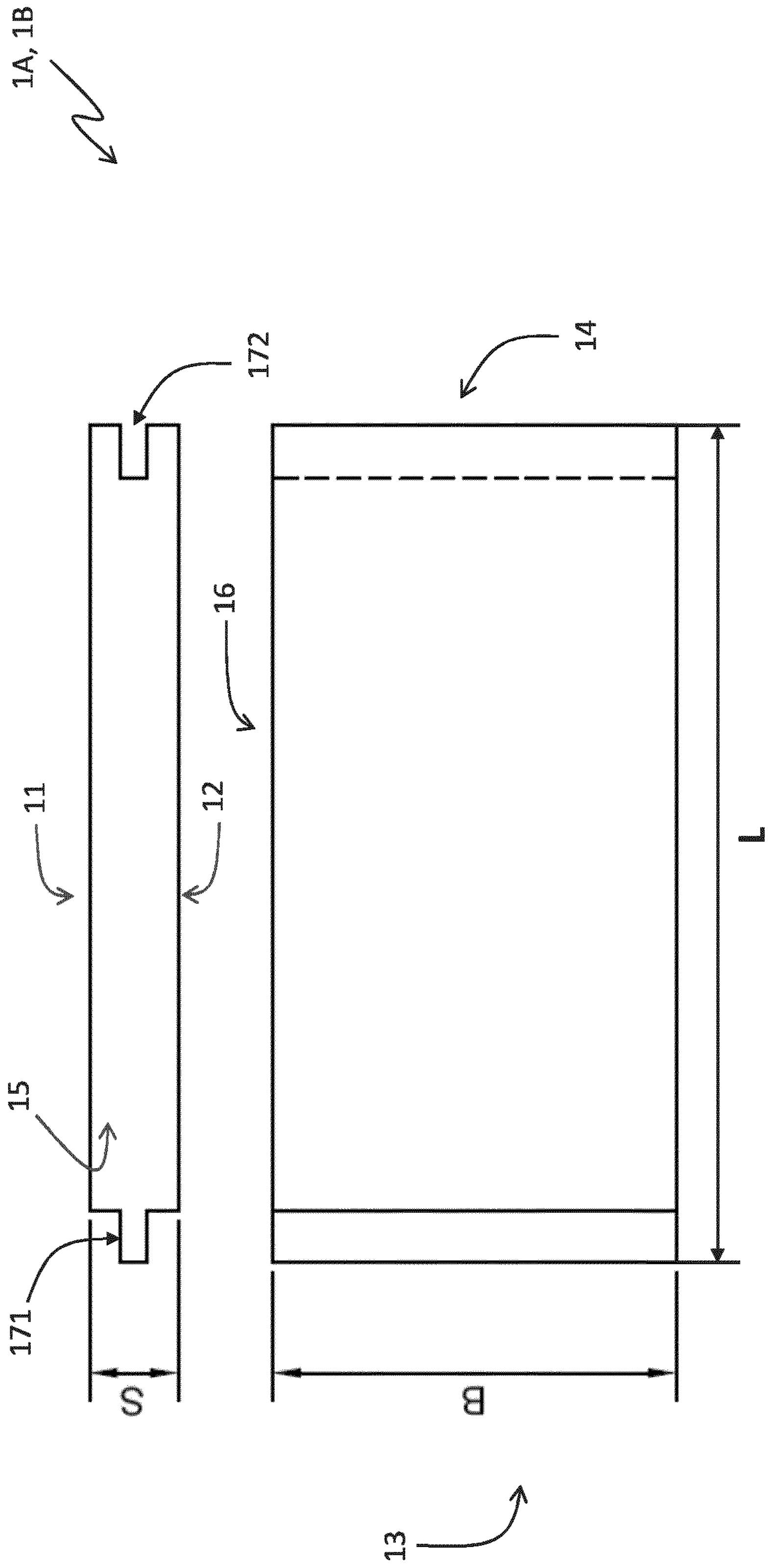
Figure 3:
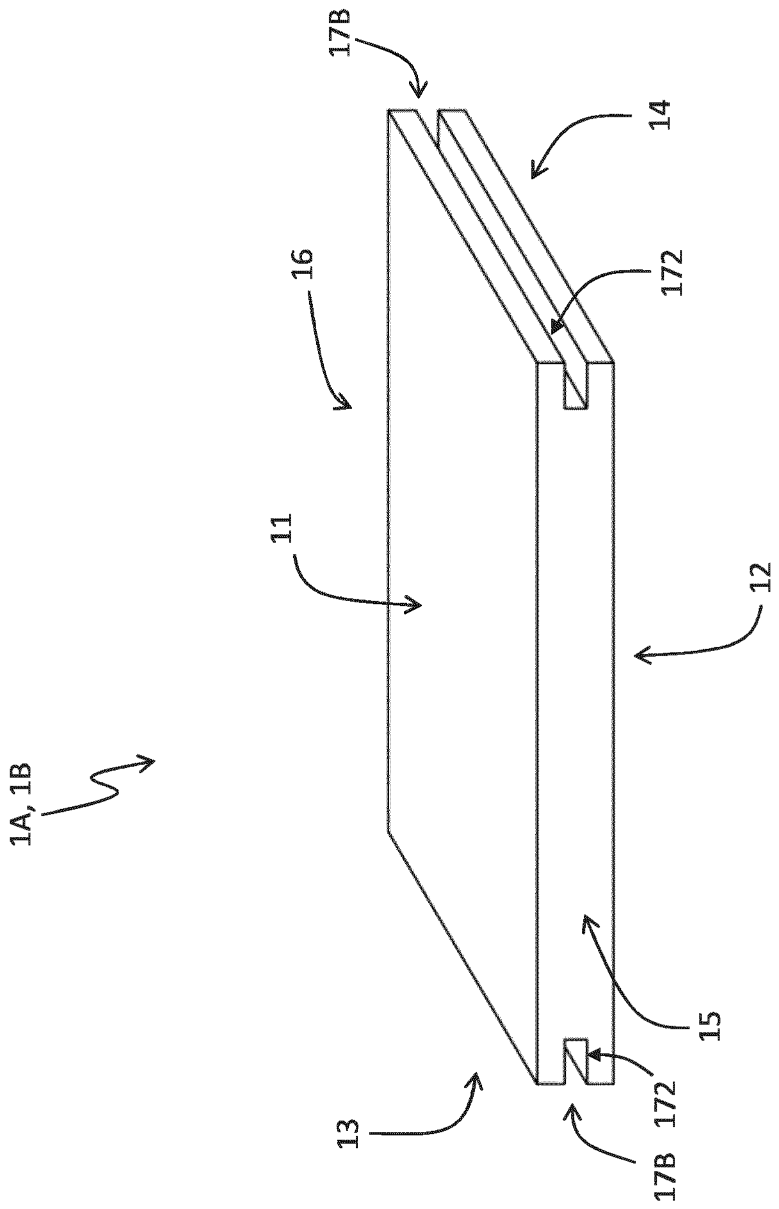
FIG. 3-4 schematically show other components for manufacturing an insulating spacer, according to another embodiment.
Figure 4:
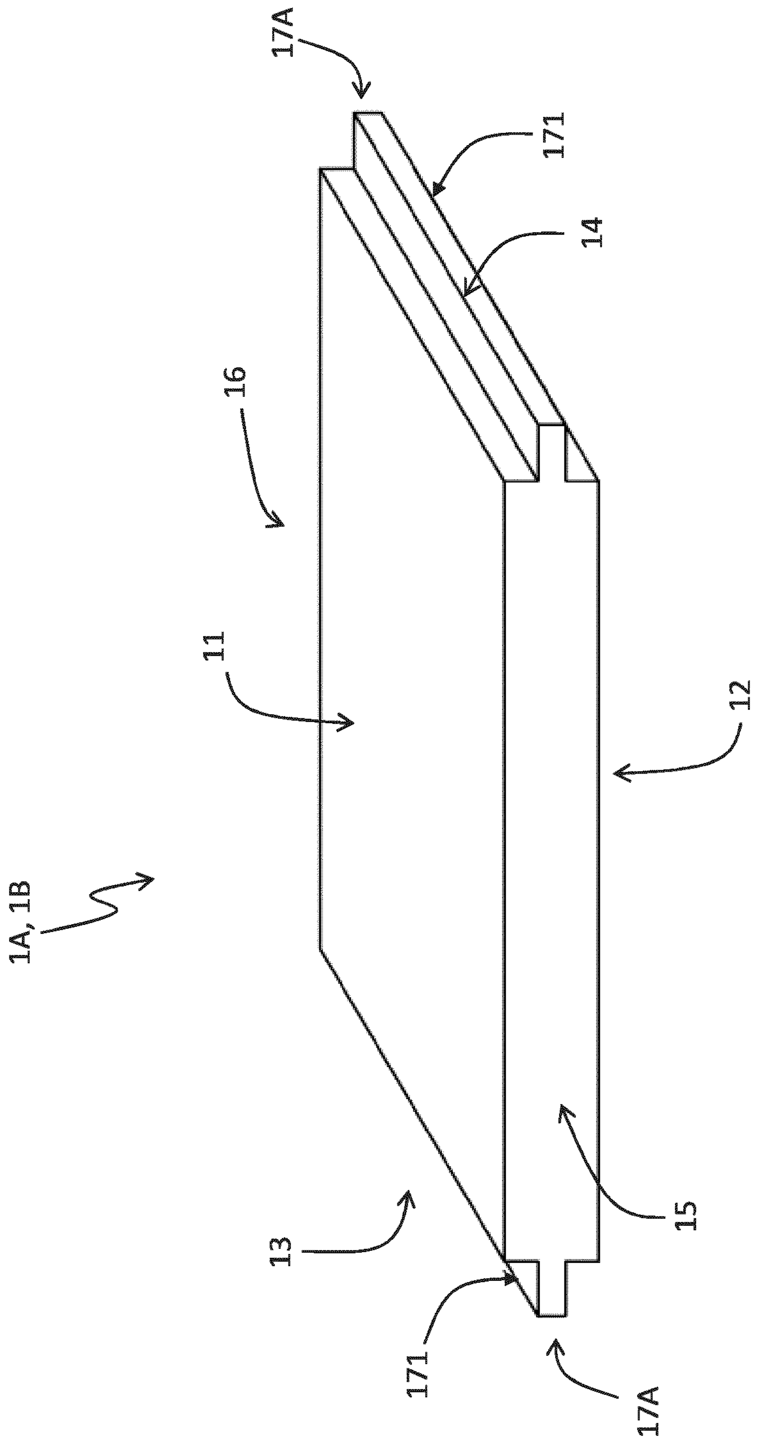

FIG. 2 shows a component 1A, 1B, which is provided with coupling means including only male-insertion elements 17A at both the first and second sides 13, 14 while FIG. 3 shows a component 1A, 1B provided with coupling means including only female-insertion elements 17B at both the first and second sides 13, 14. In this case, multiple components of these different types (i.e. male and female types) have to be combined in a modular manner to form an insulating spacer 100.

The coupling means 17A, 17B of a component 1A, 1B may be designed according to a variety of different configurations, each requiring that the component 1A, 1B is relatively moved with respect to a further component 1B, 1A so as to obtain the above-mentioned male-female insertion coupling between its coupling means 17A, 17B of said component and the complementary coupling means 17B, 17A of said further component.

According to some embodiments (FIGS. 1-7), a component 1A, 1B has coupling means 17A, 17B configured in such a way that the male-female insertion coupling with the complementary coupling means 17B, 17A of a further component 1B, 1A requires a first relative translation motion M1 of the component 1A, 1B with respect to the further component 1B, 1A. Conveniently, the first relative translation motion M1 is directed along the length L of the component 1A, 1B.

In other words, according to these embodiments, a component 1A, 1B has coupling means 17A, 17B configured in such a way that said component has to be moved towards a further component 1B, 1A with a translation motion M1 parallel to the length L in order to couple with said further component.

According to these embodiments, a component 1A, 1B may have (at one of or both the first and second sides 13, 14) one or more male-insertion elements 17A formed by corresponding shaped protrusions 171 extending along the width B of said component and/or one or more female-insertion elements 17B formed by corresponding shaped grooves 172 extending along the width B of said component.

As illustrated above, a component 1A, 1B may have (at one of or both the first and second sides 13, 14) only shaped protrusions 171 or it may have only shaped grooves 172 or it may have both shaped protrusions 171 and shaped grooves 172.

Figure 5:
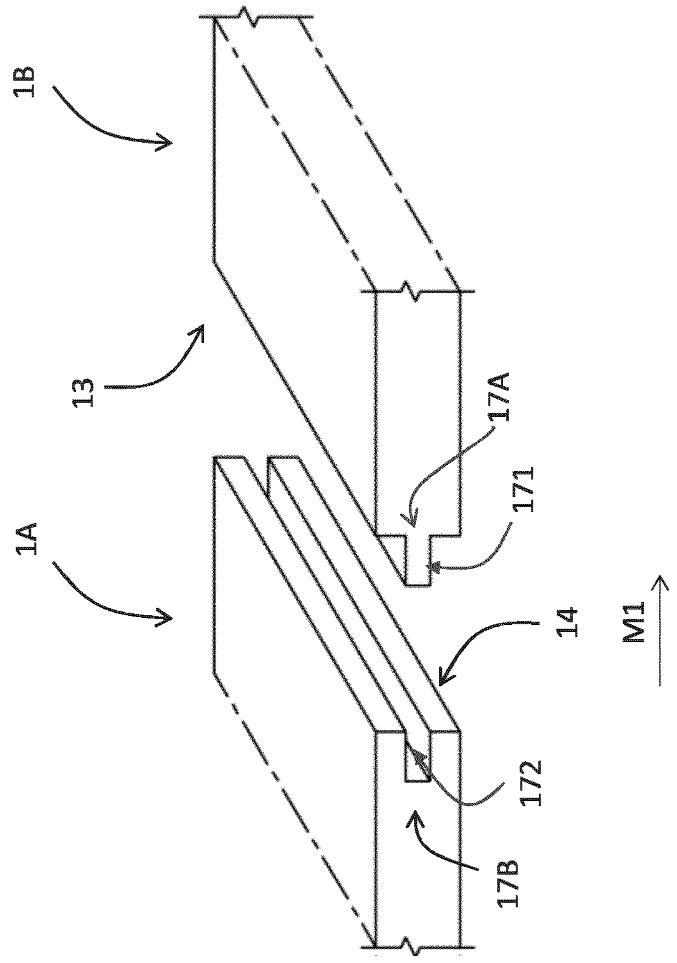
FIGS. 5-13 schematically show other components for manufacturing an insulating spacer, according to a variety of embodiments.
Figure 6:
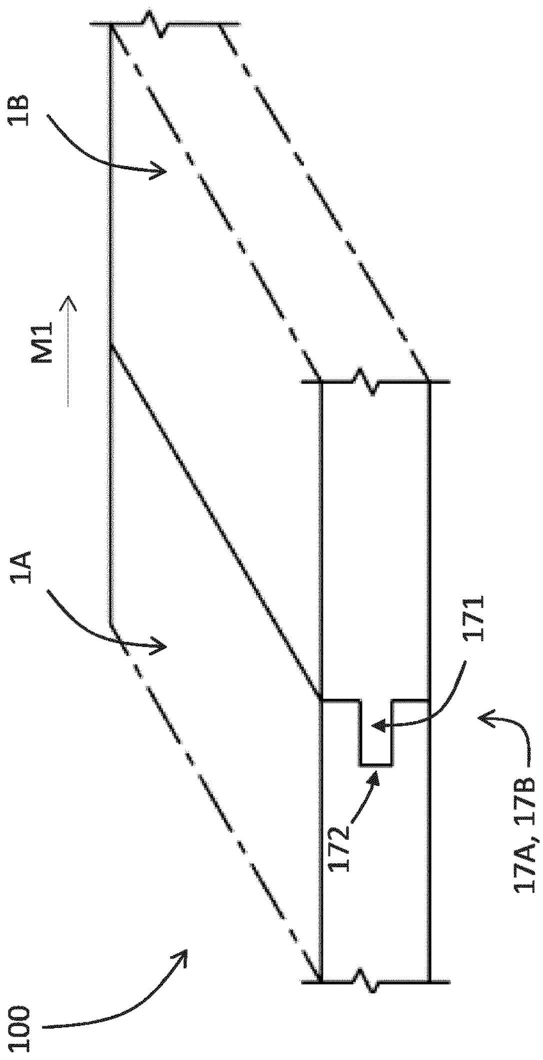

FIGS. 5-6 show a component 1A having a second side 14 provided with a shaped groove 172 extending along the width B and a component 1B having a first side 13 provided with a shaped protrusion 171 extending along the width B.

In the embodiment of FIGS. 5-6, the shaped protrusion 171 and the shaped groove 172 have complementary rectangular profiles.

As it is evident, the coupling between the components 1A, 1B may be obtained by relatively moving the component 1A towards the component 1B with a translation motion M1 directed along the length L.

Figure 7:
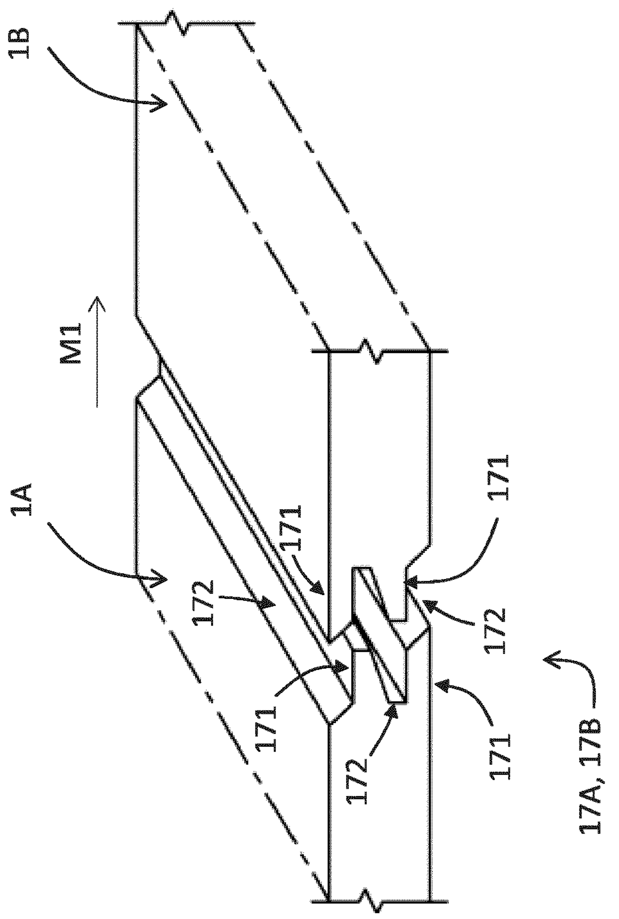

FIG. 7 shows a component 1A and a component 1B, which respectively have a second side 14 and a first side 13 provided with shaped protrusions 171 and shaped grooves 172.

The shaped protrusions 171 and the shaped grooves 172 of the components 1A, 1B have complementary shapes and they are conveniently arranged in alternate positions so that they can couple one with another.

In the embodiment of FIG. 7, the shaped protrusions 171 and the shaped grooves 172 have complementary trapezoidal profiles.

Also in this case, the coupling between the components 1A, 1B may be obtained by relatively moving the component 1A towards the component 1B with a translation motion M1 directed along the length L.

Referring to the above-illustrated examples, it is apparent that shaped protrusions 171 and shaped grooves 172, which have complementary profiles with a different geometry, may be designed to realize coupling means 17A, 17B of the same type.

According to some embodiments, a component 1A, 1B has coupling means 17A, 17B configured in such a way that the male-female insertion coupling with the complementary coupling means 17B, 17A of a further component 1B, 1A requires a second relative translation motion M2 of the component 1A, 1B with respect to the further component 1B, 1A. Conveniently, the second relative translation motion M2 is directed along the width B of the component 1A, 1B.

In other words, according to these embodiments, a component 1A, 1B has coupling means 17A, 17B configured in such a way that it has to be moved towards a further component 1B, 1A with a translation motion M2 parallel to the width B in order to couple with said further component.

According to these embodiments, a component 1A, 1B may have (at one of or both the first and second sides 13, 14) one or more male-insertion elements 17A formed by corresponding shaped protrusions 173 extending along the width B of said component and/or one or more female-insertion elements 17B formed by corresponding shaped grooves 174 extending along the width B of said component.

As illustrated above, a component 1A, 1B may have (at one of or both the first and second sides 13, 14) only shaped protrusions 173 or it may have only shaped grooves 174 or it may have both shaped protrusions 173 and shaped grooves 174.

Figure 8:
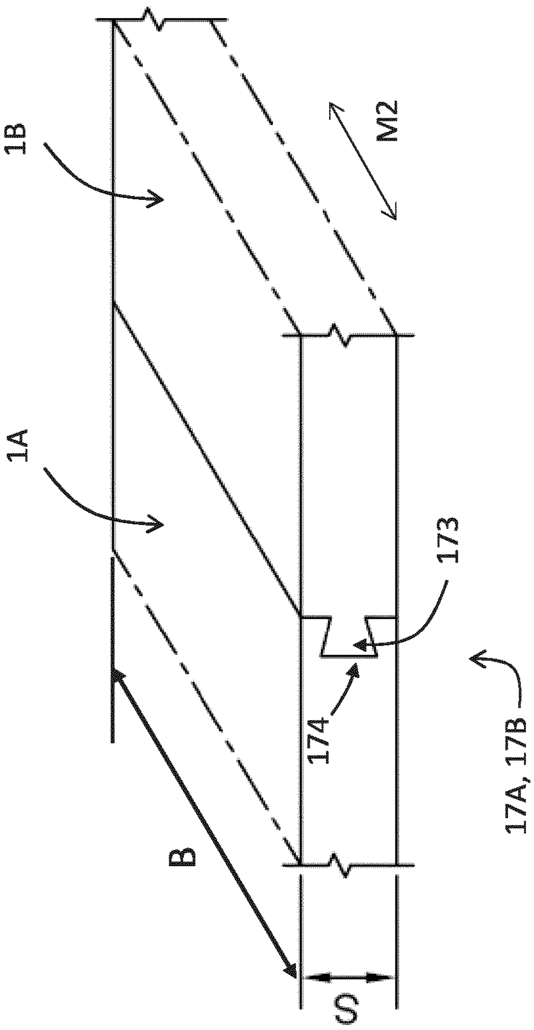

FIG. 8 shows a component 1A having a second side 14 provided with a shaped groove 174 extending along the width B and a component 1B having a first side 13 provided with a shaped protrusion 173 extending along the width B.

In the embodiment of FIGS. 8, the shaped protrusion 173 and the shaped groove 174 have complementary dovetail profiles.

As it is evident, the coupling between the components 1A, 1B may be obtained by relatively moving the component 1A towards the component 1B with a translation motion M2 directed along the width B.

Figure 9:
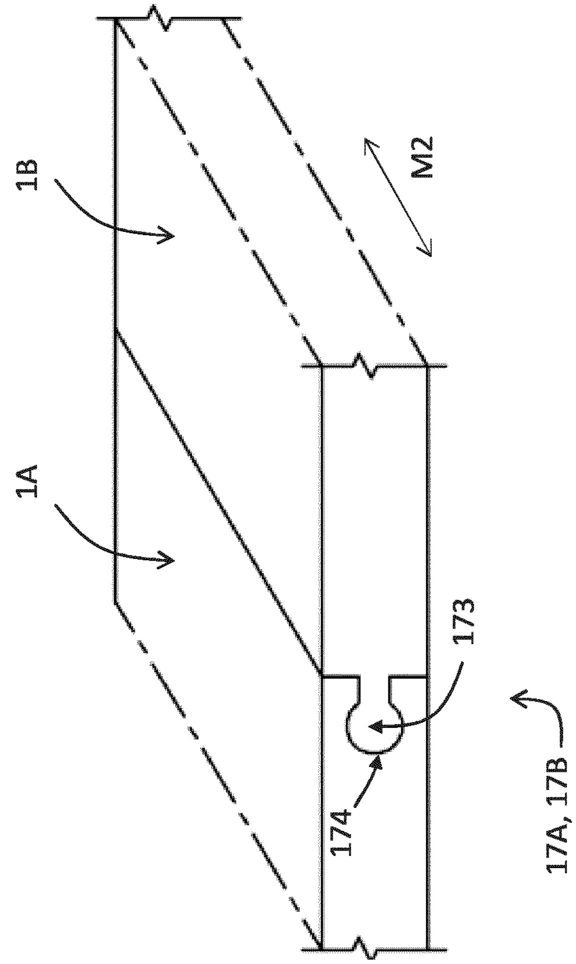

FIG. 9 shows a component 1A having a second side 14 provided with a shaped groove 174 extending along the width B and a component 1B having a first side 13 provided with a shaped protrusion 173 extending along the width B.

In the embodiment of FIGS. 9, the shaped protrusion 173 and the shaped groove 174 have complementary rounded profiles (e.g., match head profiles).

As it is evident, the coupling between the components 1A, 1B may be obtained by relatively moving the component 1A towards the component 1B with a translation motion M2 directed along the width B.

Referring to the above-illustrated examples, it is apparent that shaped protrusions 173 and shaped grooves 174, which have complementary profiles with a different geometry, may be designed to realize coupling means 17A, 17B of the same type.

The embodiments shown in FIGS. 8-9 are particularly advantageous as the coupling means 17A, 17B of each component 1A, 1B of the invention are designed so that said components form an insulating spacer 100 having a self-supporting structure when they are modularly combined one with another.

According to some embodiments (FIG. 10), a component 1A, 1B has coupling means 17A, 17B configured in such a way that the male-female insertion coupling with the complementary coupling means 17B, 17A of a further component 1B, 1A requires a third relative rotary-translation motion M3 of the component 1A, 1B with respect to the further component 1B, 1A. Conveniently, the third relative rotary-translation motion M3 includes a rotation around the width B and a translation along the length L of the component 1A, 1B.

In other words, according to these embodiments, a component 1A, 1B has coupling means 17A, 17B configured in such a way that it has to be moved towards a further component 1B, 1A with a rotary-translation motion M3.

According to these embodiments, a component 1A, 1B may have one or both the first and second sides 13, 14 that include first or second shaped head portions 175 and 177 at which corresponding shaped protrusions 176 or shaped grooves 178 are obtained, respectively.

The shaped protrusions 176 at the first shaped head portions 175 form one or more male-insertion elements 17A while the shaped grooves 178 at the second shaped head portions 177 form one or more female-insertion elements 17B.

Figure 10:
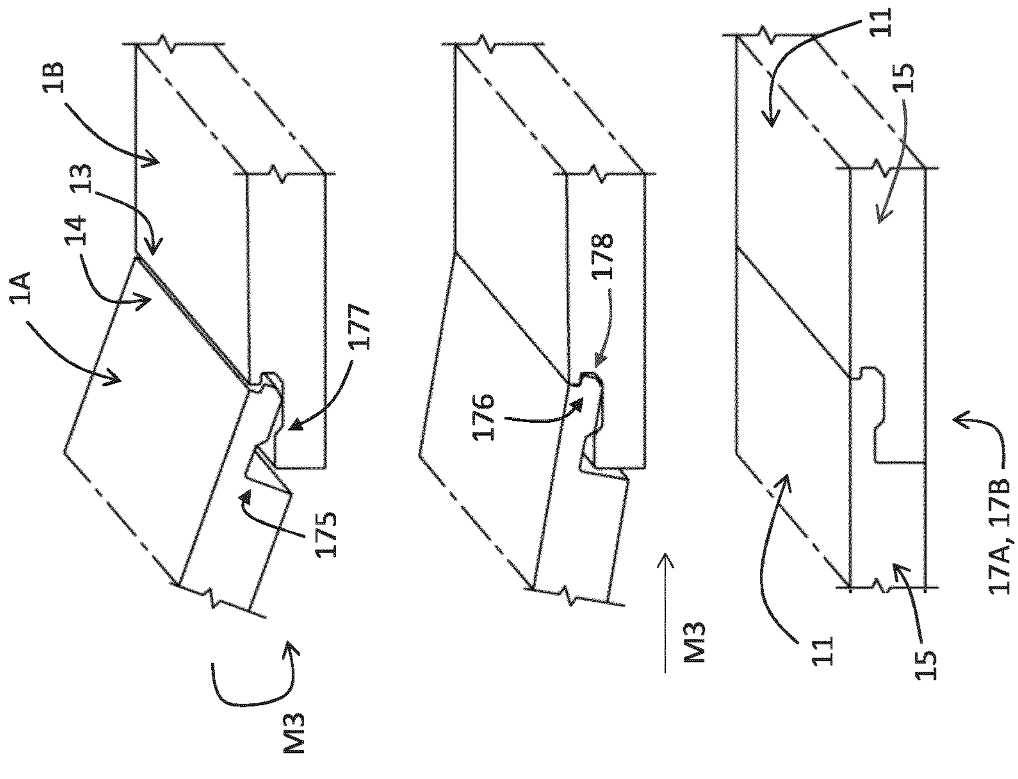

FIG. 10 shows a component 1A and a component 1B, which respectively have a second side 14 and a first side 13 respectively provided with first and second head portions 175 and 177 having complementary shapes and arranged in alternate positions so that they can couple one with another.

The first head portions 175 have shaped protrusions 176 while the second head portions 177 have shaped grooves 178.

The shaped protrusions 176 and the shaped grooves 178 extend along the width B of the corresponding components 1A, 1B and they have complementary toothed profiles. shaped protrusions 171 and shaped grooves 172.

As it is evident, the coupling between the components 1A, 1B may be obtained by relatively moving the component 1A towards the component 1B with a with a rotary-translation motion M3.

Referring to the above-illustrated example, it is apparent that the shaped head portions 175 and 177, the shaped protrusions 176 and the shaped grooves 178 may have complementary profiles with a different geometry to realize coupling means 17A, 17B of the same type.

Also, in these embodiments , the coupling means 17A, 17B of each component 1A, 1B are designed so that these components form an insulating spacer 100 having a self-supporting structure when they are modularly combined one with another.

According to some embodiments (FIGS. 11-13), a component 1A, 1B has coupling means 17A, 17B configured in such a way that the male-female insertion coupling with the complementary coupling means 17B, 17A of a further component 1B, 1A requires a fourth relative translation motion M4 of the component 1A, 1B with respect to the further component 1B, 1A. Conveniently, the second relative translation motion M2 is directed perpendicularly to the first and second surfaces 11, 12 (i.e. along the thickness S of the component).

According to these embodiments, a component 1A, 1B has coupling means 17A, 17B configured in such a way that it has to be moved towards a further component 1B, 1A with a translation motion M4 perpendicular to the first and second surfaces 11, 12 in order to couple with said further component.

According to these embodiments, a component 1A, 1B may have (at one of or both the first and second sides 13, 14) one or more male-insertion elements 17A formed by corresponding shaped protrusions 179A extending perpendicular to the first and second surfaces 11, 12 and/or one or more female-insertion elements 17B formed by corresponding shaped grooves 179B extending perpendicular to the first and second surfaces 11, 12.

As illustrated above, a component 1A, 1B may have (at one of or both the first and second sides 13, 14) only shaped protrusions 179A or it may have only shaped grooves 179B or it may have both shaped protrusions 179A and shaped grooves 179B.

Figure 11:
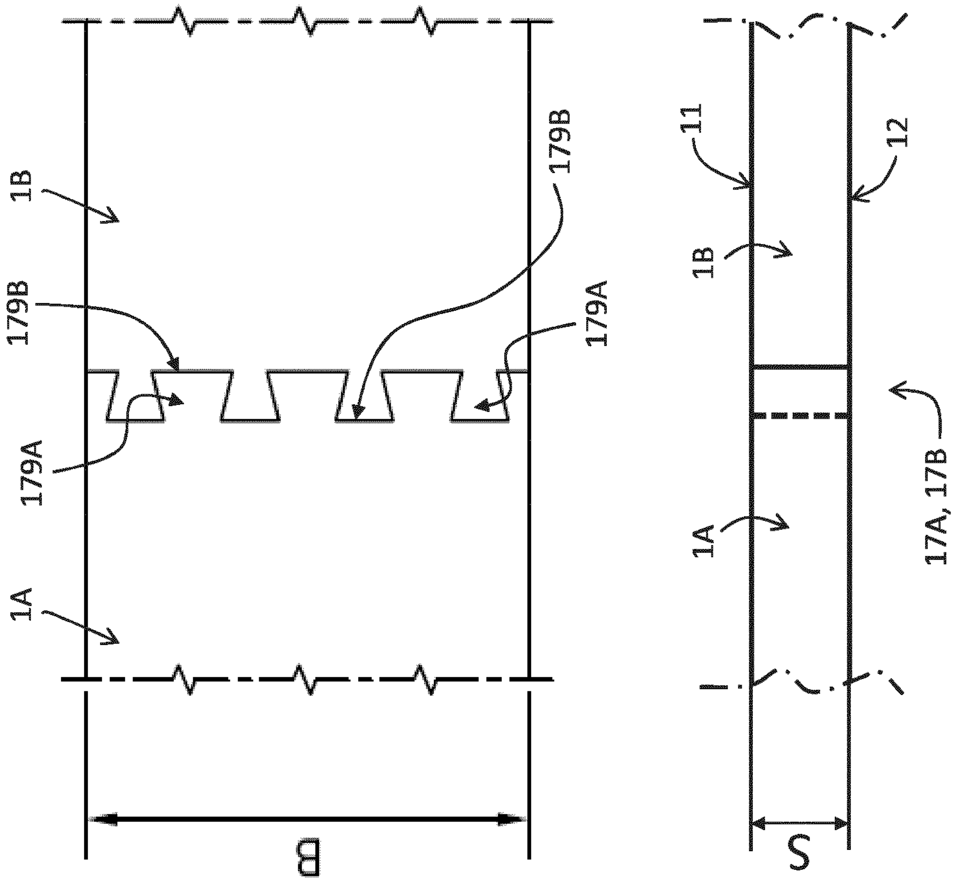

FIG. 11 shows a component 1A and a component 1B, which respectively have a second side 14 and a first side 13 provided with shaped protrusions 179A and shaped grooves 179B.

The shaped protrusions 179A and the shaped grooves 179B of the components 1A, 1B have complementary shapes and they are conveniently arranged in alternate positions so that they can couple one with another.

In the embodiment of FIG. 11, the shaped protrusions 179A and the shaped grooves 179B have complementary dovetail profiles.

As it is evident, the coupling between the components 1A, 1B may be obtained by relatively moving the component 1A towards the component 1B with a translation motion M4 directed perpendicularly to the first and second surfaces 11, 12.

Figure 12:
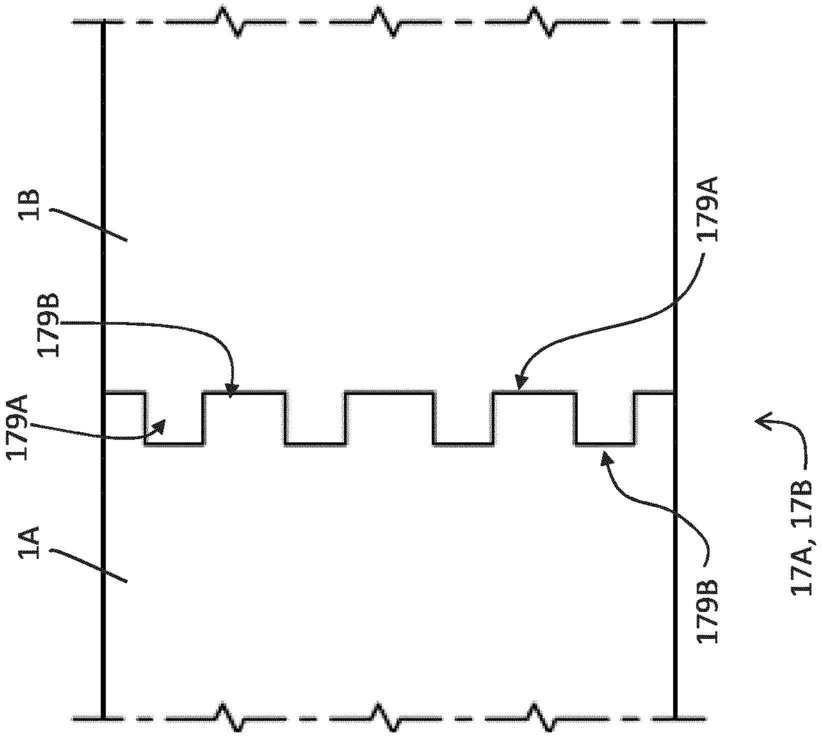

FIG. 12 shows a component 1A and a component 1B arranged similarly to that one of FIG. 11, in which the shaped protrusions 179A and the shaped grooves 179B have complementary rectangular profiles.

Also in this case, the coupling between the components 1A, 1B may be obtained by relatively moving the component 1A towards the component 1B with a translation motion M4 directed perpendicularly to the first and second surfaces 11, 12.

Figure 13:
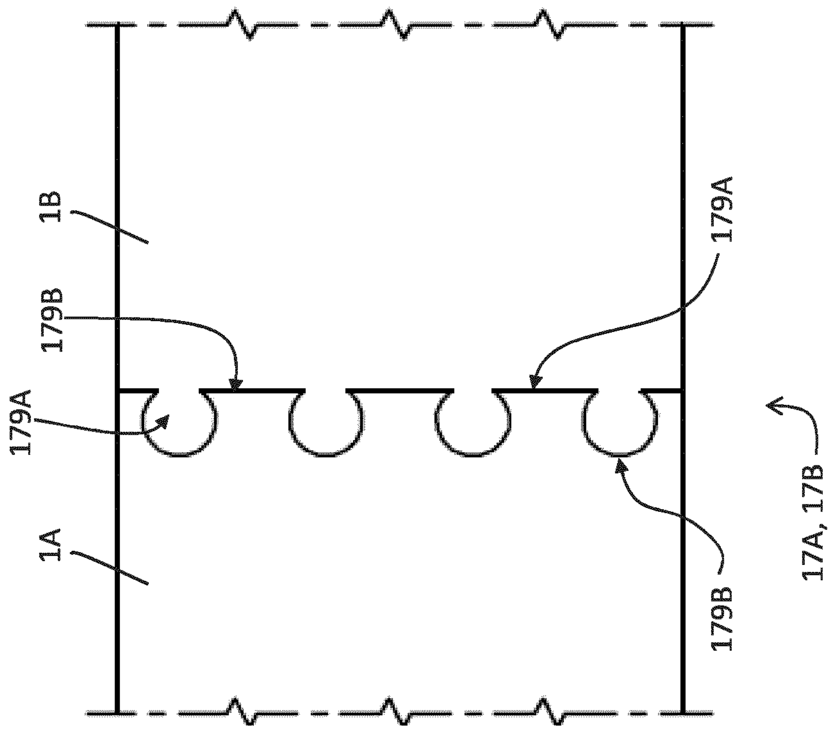

FIG. 13 shows a component 1A and a component 1B arranged similarly to those of FIGS. 11-12, in which the shaped protrusions 179A and the shaped grooves 179B have complementary rounded profiles.

Also in this case, the coupling between the components 1A, 1B may be obtained by relatively moving the component 1A towards the component 1B with a translation motion M4 directed perpendicularly to the first and second surfaces 11, 12.

Referring to the above-illustrated examples, it is apparent that shaped protrusions 179A and shaped grooves 170B, which have complementary profiles with a different geometry, may be designed to realize coupling means 17A, 17B of the same type.

Also, in these embodiments, the coupling means 17A, 17B of each component 1A, 1B are designed so that these components form an insulating spacer 100 having a self-supporting structure when they are modularly combined one with another.

According to an aspect , a component 1A, 1B comprises fixing means 18 for coupling with a support element of an electric winding 90.

Preferably, such a support element is an insulating block or rod of the electric winding, which extends in parallel to the winding direction of said electric winding.

Preferably, the fixing means 18 may be arranged at the first side 13 or at the second side 14. In principle, however, they may be arranged also at both the first and second sides 13, 14.

Figure 14:
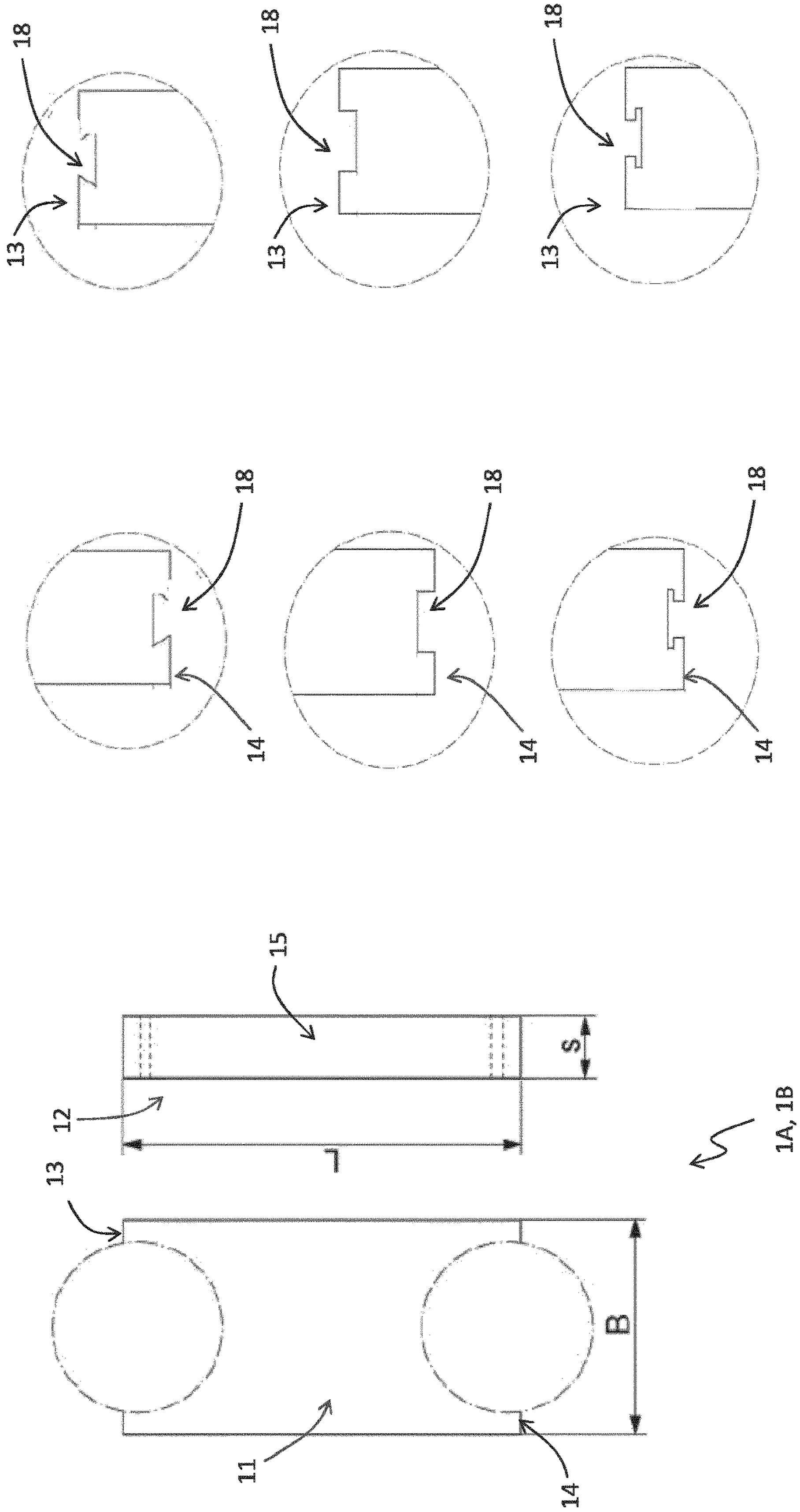
FIG. 14 schematically shows some variants of a component for manufacturing an insulating spacer.

Preferably, the fixing means 18 include a shaped groove extending according to a direction perpendicular to the first and second surfaces 11, 12 of the component 1A, 1B. The shaped groove 18 may be configured according to a variety of geometric profiles, such as a dovetail profile, a rectangular profile or a T-shaped profile, as shown in FIG. 14.

As mentioned above, the component 1A, 1B is manufactured at industrial level through industrial molding processes of known type.

Preferably, a method for manufacturing the component 1A, 1B in accordance with the disclosure comprises the step of providing a semi-finished product of plastic material (e.g., a plate or a stripe of plastic material) through an industrial moulding process, e.g., an injection molding process.

Preferably, the above-mentioned semi-finished product includes predefined breaking lines.

Conveniently, said breaking lines may be obtained by suitably designing an industrial mould according to known mould designing techniques.

Preferably, said breaking lines are designed in such a way to define the profile of a number of components 1A, 1B having a different shape and/or size.

Preferably, a method for manufacturing a component 1A, 1B comprises the step breaking the above-mentioned semi-fished product along the above-mentioned breaking lines. The component 1A, 1B may thus be finally obtained.

The above-illustrated manufacturing method allows obtaining components 1A, 1B, which have different shapes or lengths, using a same industrial mould. This entails relevant savings of industrial costs.

In principle, however, the component 1A, 1B may be manufactured by employing standard industrial moulding process of known type.

According to an important aspect, the present disclosure relates also to a method for manufacturing an insulating spacer 100 for an electromagnetic induction apparatus.

The method comprises the following steps:

providing at least first and second components 1A, 1B, which have the features described above;

joining said first and second components 1A, 1B by coupling the respective coupling means 17A, 17B of said first and second components at a first side 13 or at a second side 14 of said first and second components.

According to an important aspect, the present disclosure relates also to an insulating spacer 100 for an electromagnetic induction apparatus, which comprises at least two components as described above.

In particular, an insulating spacer 100 comprises at least a first component and a second component. At a first side 13 or at a second side 14, the first component has coupling means 17A, 17B coupled with complementary coupling means 17B, 17A of the second component, at a first side 13 or at a second side 14 of said second component.

FIG. 15 schematically shows an example of insulating spacer 100 including two components 1A, 1B, which are modularly combined according to the method of the invention.

The component 1A comprises a first side 13, at which fixing means 18, which include a shaped groove perpendicular to the first surface 11 of the component, for fixing to a supporting rod of an electric winding are arranged.

The component 1A comprises a second side 14, at which coupling means 17B for coupling with a further component, which include a shaped groove extending parallel to the width B of the component, are arranged (similarly to the embodiment shown in FIG. 5).

The component 1B comprises a first side 13, at which coupling means 17A for coupling with a further component, which include a shaped protrusion, are arranged (similarly to the embodiment shown in FIG. 5) and a second side 14 having a simple rectilinear profile.

The components 1A, 1B may be joined with a simple maneuver, in which they brought one near another, e.g., with translation movements along their length.

An insulating spacer 100 may be formed by three or more components, according to the disclosure.

FIG. 16 schematically shows an example of insulating spacer 100 including three components 1A, 1B, 1C, which are modularly combined according to the method of the disclosure.

The components 1A, 1B are similar to those shown in FIG. 15 while the component 1C comprises coupling means 17B for coupling with a further component, which include a shaped groove, at both the first and second sides 13, 14 (similarly to the embodiment shown in FIG. 3).

Also in this case, the components 1A, 1B, 1C may be joined with a simple maneuver, in which they brought one near another, e.g., with translation movements along their length.

Referring to the above-illustrated examples, it is apparent that an insulating spacer 100 may be obtained by joining two or more components, which have different configurations from those illustrated in FIGS. 15-16, e.g., configurations suitably selected among those illustrated in FIGS. 1-13.

In a further aspect, the present disclosure relates to an electric winding 90 for electromagnetic induction apparatuses, which comprises one or more insulating spacers 100.

Figure 17:
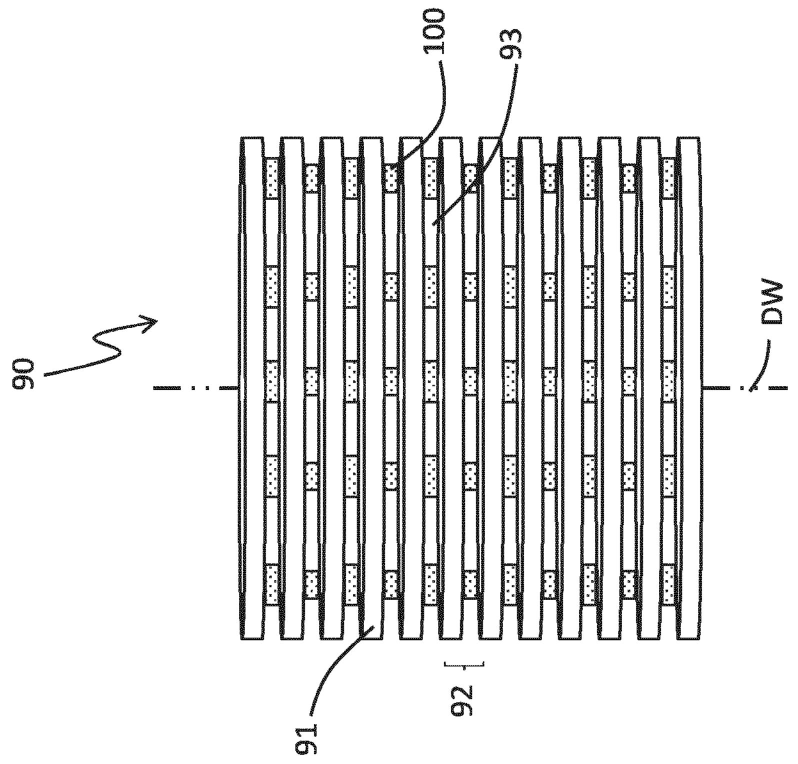
FIG. 17 schematically shows an electric winding for an electromagnetic induction apparatus, which includes multiple insulating spacers made according to the method of the disclosure.

FIG. 17 schematically shows as example of industrial winding 90 including insulating spacers 100.

Preferably, the electric winding 90 includes a conductor structure 91 (e.g., including a continuously transposed conductor) wound along a winding direction DW.

The electric winding 90 has a plurality of adjacent turns 92 arranged around the winding direction DW.

Each turn 92 is formed by a corresponding longitudinal portion of the conductor included in the conductor structure 91.

The electric winding 90 comprises multiple insulating spacers 100, which are arranged between each pair of adjacent turns 92.

The insulating spacers 100 extend along radial planes perpendicular to the winding direction DW and form radial channels 93 of the electric winding 90, which ensure the passage of an electrically insulating medium (e.g., insulating fluid or solid cast resin) among the adjacent turns 92.

The insulating spacers 100 may be fixed to the turns 92 by gluing or according to other solutions of known type.

The component 1A, 1B and the method for manufacturing an insulating spacer 100, according to the disclosure, provide relevant advantages with respect to known solutions of the state of the art.

The method allows obtaining high quality plastic insulating spacers 100 of any desired length by modularly combining multiple (preferably two) components 1A, 1B along their length.

Plastic insulating spacers may therefore be extensively used also in electric windings of huge size.

The component 1A, 1B is relatively easy to realize at industrial level at competitive costs, since it may be manufactured with industrial molding processes of known type.

The method is very easy to implement at industrial level, even by means of automatic handling apparatuses, as the coupling means 17A, 17B of each component 1A, 1B may be suitably designed in such a way to make possible their coupling with simple maneuvers and in such a way to provide insulating spacers 100 having a self-supporting structure without the need of fixing means (e.g., glue) to maintain the different components 1A, 1B in their operative positions.

The invention claimed is:

1. A first component for manufacturing an insulating spacer for an electromagnetic induction apparatus, said first component being formed by a body of plastic material having opposite first and second surfaces, opposite first and second sides and opposite third and fourth sides, a first distance between said first and second surfaces defining a thickness of said first component, a second distance between said third and fourth sides defining a width of said first component, and a third distance between said first and second sides defining a length of said first component, wherein the width of the first component is greater than the thickness of the first component;

wherein at least one of said first and second sides comprises coupling means wherein the coupling means comprise one or more male-insertion elements for coupling with one or more complementary female-insertion elements of a second component and/or one or more female-insertion elements of the coupling means for coupling with one or more complementary male-insertion elements of the second component for manufacturing said insulating spacer, wherein the first component and the second component have a substantially similar second distance such that the one or more male-insertion elements and the one or more female-insertion elements and the one or more complementary male-insertion elements and the complementary female-insertion elements extend along the width of the first component and a width of the second component;

wherein the coupling means of said first component is configured so that the coupling with the complementary coupling means of said second component requires a second relative translation motion of said first component with respect to said second component, said second relative translation motion being directed along the width of said first component and wherein the coupling means of the first component prevents coupling to the complementary coupling means of the second component via a first relative translation motion corresponding to a direction along the length of the first component, wherein the first component and the second component are insulating spacer components that are coupled via the second relative translation motion to form a section of the insulating spacer;

wherein at least one of the length of the first component and a length of the second component does not exceed 8 centimeters.

2. The first component according to claim 1, wherein said one or more male-insertion elements comprise one or more shaped protrusions extending along the width of said first component.

3. The first component according to claim 1, wherein said one or more female-insertion elements comprise one or more one or more shaped grooves extending along the width of said first component.

4. The first component according to claim 1, wherein said one or more male-insertion elements comprise one or more shaped protrusions extending along the width of said first component.

5. The first component according to claim 1, wherein the coupling means of said first component are configured so that the coupling with the complementary coupling means of said second component requires a third relative rotary-translation motion of said first component with respect to said second component, said third relative rotary-translation motion including a rotation of said first component around the width of said first component and a translation of said first component along the length of said first component.

6. The first component according to claim 5, wherein said one or more male-insertion elements comprise one or more shaped protrusions at one or more first shaped head portions of at least one of said first and second sides, said first head portions and said shaped protrusions extending along the width of said first component.

7. The first component according to claim 5, wherein said one or more female-insertion elements comprise one or more shaped grooves at one or more second shaped head portions of at least one of said first and second sides, said second head portions and said shaped grooves extending along the width of said first component.

8. The first component according to claim 1, wherein the coupling means of said first component are configured so that the coupling with the complementary coupling means of said second component requires a fourth relative translation motion of said first component with respect to said second component, said fourth relative translation motion being directed perpendicularly to said first and second surfaces.

9. The first component according to claim 8, wherein said one or more male-insertion elements comprise one or more shaped protrusions extending perpendicularly to said first and second surfaces.

10. The first component according to claim 8, wherein said one or more female-insertion elements comprise one or more shaped grooves extending perpendicularly to said first and second surfaces.

11. The first component according to claim 1, wherein at least one of said first and second sides comprises fixing means.

12. A method for manufacturing an insulating spacer for an electromagnetic induction apparatus, the method comprising:

providing at least a first component and a second component, according to claim 1; and joining said first component and said second component by coupling the coupling means of said first component and with the complementary coupling means of said second component;

wherein the coupling means of said first component is configured so that the coupling with the complementary coupling means of said second component requires a second relative translation motion of said first component with respect to said second component, said second relative translation motion being directed along the width of said first component and wherein the coupling means of the first component prevents coupling to the complementary coupling means of the second component via a first relative translation motion corresponding to a direction along the length of the first component, wherein the first component and the second component are insulating spacer components that are coupled via the second relative translation motion to form a section of the insulating spacer.

13. The method of claim 12, wherein joining said first component and said second component comprising bringing said first component and said second component near each other with translation movement along a length of said first component and a length of said second component to enable the complementary coupling to join said first component and said second component.

14. An insulating spacer for an electromagnetic induction apparatus comprising:

a first component being formed by a body of plastic material having opposite first and second surfaces, opposite first and second sides and opposite third and fourth sides, a first distance between said first and second surfaces defining a thickness of said first component, a second distance between said third and fourth sides defining a width of said first component, and a third distance between said first and second sides defining a length of said first component, wherein the width of the first component is greater than the thickness of the first component; and a second component, wherein said first component having coupling means coupled with a complementary coupling means of said second component;

wherein the coupling means of said first component is configured so that the coupling with the complementary coupling means of said second component requires a second relative translation motion of said first component with respect to said second component, said second relative translation motion being directed along the width of said first component and wherein the coupling means of the first component prevents coupling to the complementary coupling means of the second component via a first relative translation motion corresponding to a direction along the length of the first component, wherein the first component and the second component are insulating spacer components that are coupled via the second relative translation motion to form a section of the insulating spacer;

wherein at least one of the length of the first component and a length of the second component does not exceed 8 centimeters.

15. An electric winding for an electromagnetic induction apparatus comprising at least an insulating spacer according to claim 14.

16. An electromagnetic induction apparatus comprising at least an insulating spacer according to claim 14.

* * * * *